US012562436B2

(12) United States Patent
Kim et al.

(10) Patent No.: US 12,562,436 B2
(45) Date of Patent: Feb. 24, 2026

(54) SEPARATOR AND LITHIUM BATTERY EMPLOYING SAME

(71) Applicant: SAMSUNG SDI CO., LTD., Yongin-si (KR)

(72) Inventors: Jinyoung Kim, Yongin-si (KR); Hana Kim, Yongin-si (KR); Byungmin Lee, Yongin-si (KR); Minho Cho, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 94 days.

(21) Appl. No.: 18/013,299

(22) PCT Filed: May 13, 2022

(86) PCT No.: PCT/KR2022/006870

§ 371 (c)(1),
(2) Date: Sep. 22, 2023

(87) PCT Pub. No.: WO2022/240228

PCT Pub. Date: Nov. 17, 2022

(65) Prior Publication Data

US 2024/0014511 A1 Jan. 11, 2024

(30) Foreign Application Priority Data

May 14, 2021 (KR) ........................ 10-2021-0062751

(51) Int. Cl.

*H01M 50/457* (2021.01)
*H01M 10/052* (2010.01)

(Continued)

(52) U.S. Cl.

CPC ....... *H01M 50/457* (2021.01); *H01M 10/052* (2013.01); *H01M 10/0525* (2013.01);

(Continued)

(58) Field of Classification Search

None

See application file for complete search history.

(56) References Cited

U.S. PATENT DOCUMENTS

| | | | |
|---|---|---|---|
| 6,306,545 | B1 | 10/2001 | Carlson et al. |
| 7,833,654 | B2 | 11/2010 | Ichikawa et al. |

(Continued)

FOREIGN PATENT DOCUMENTS

| | | | |
|---|---|---|---|
| JP | 4426721 | B2 | 12/2009 |
| JP | 2019-525439 | A | 9/2019 |

(Continued)

OTHER PUBLICATIONS

KR20150064438A Machine Translation (Year: 2015).*

(Continued)

*Primary Examiner* — Haroon S. Sheikh

(74) *Attorney, Agent, or Firm* — Lee IP Law, P.C.

(57) ABSTRACT

The separator includes: a porous substrate; a first coating layer arranged on at least one surface of the porous substrate, the first coating layer including a binder and inorganic particles, wherein the binder includes a cross-linked product of an aqueous cross-linking reactive poly(vinylamide)-based copolymer, wherein the poly(vinylamide)-based copolymer includes repeating units derived from vinylamide monomers and repeating units derived from cross-linking reactive group-containing monomers, and is cross-linked by the cross-linking reactive groups; and a second coating layer arranged on both surfaces of the porous substrate on which the first coating layer is arranged, the second coating layer including an acrylic copolymer and a polyvinylidene fluoride-based binder in a weight ratio of greater than 1:1 and less than 1:4. The separator has high thermal resistance (Continued)

characteristics and enhanced electrode plate adhesion, and therefore, a lithium battery having excellent lifespan characteristics may be provided.

19 Claims, 3 Drawing Sheets

(51) Int. Cl.

| | |
|---|---|
| ***H01M 10/0525*** | (2010.01) |
| ***H01M 50/417*** | (2021.01) |
| ***H01M 50/42*** | (2021.01) |
| ***H01M 50/423*** | (2021.01) |
| ***H01M 50/426*** | (2021.01) |
| ***H01M 50/446*** | (2021.01) |

(52) U.S. Cl.

CPC ......... *H01M 50/417* (2021.01); *H01M 50/42* (2021.01); *H01M 50/423* (2021.01); *H01M 50/426* (2021.01); *H01M 50/446* (2021.01)

(56) References Cited

U.S. PATENT DOCUMENTS

| | | | |
|---|---|---|---|
| 10,059,085 | B2 | 8/2018 | Okugawa et al. |
| 10,468,652 | B2 | 11/2019 | Jang et al. |
| 10,586,969 | B2 | 3/2020 | Sung et al. |
| 2015/0200387 | A1 | 7/2015 | Nishikawa et al. |
| 2016/0293999 | A1 | 10/2016 | Kim et al. |
| 2018/0034028 | A1 | 2/2018 | Jung et al. |
| 2019/0237732 | A1 | 8/2019 | Hu et al. |
| 2024/0006717 | A1 | 1/2024 | Choi et al. |

FOREIGN PATENT DOCUMENTS

| | | | | | |
|---|---|---|---|---|---|
| KR | 10-1025187 | B1 | | 3/2011 | |
| KR | 10-1491059 | B1 | | 2/2015 | |
| KR | 10-2015-0064438 | A | | 6/2015 | |
| KR | 2015064438 | A | * | 6/2015 | .......... H01M 10/052 |
| KR | 10-2017-0022042 | A | | 3/2017 | |
| KR | 10-2017-0027677 | A | | 3/2017 | |
| KR | 10-1749878 | B1 | | 6/2017 | |
| KR | 10-2017-0108063 | A | | 9/2017 | |
| KR | 2017108063 | A | * | 9/2017 | ............. C04B 14/02 |
| KR | 10-2018299 | B1 | | 11/2019 | |
| KR | 10-2072763 | B1 | | 3/2020 | |
| KR | 10-2020-0078416 | A | | 7/2020 | |
| KR | 2020078416 | A | * | 7/2020 | .......... H01M 10/052 |
| KR | 2020-0140637 | A | | 12/2020 | |
| WO | WO 2016/123404 | A1 | | 8/2016 | |

OTHER PUBLICATIONS

KR20200078416A Machine Translation (Year: 2020).*

International Search Report dated Aug. 23, 2022, of PCT Patent Application No. PCT/KR2022/006870.

Korean Office action dated Aug. 21, 2025.

* cited by examiner

SEPARATOR AND LITHIUM BATTERY EMPLOYING SAME

CROSS REFERENCE TO RELATED APPLICATIONS

This is the U.S. national phase application of PCT/KR2022/006870, filed May 13, 2022, which is based on Korean Patent Application No. 10-2021-0062751, filed May 14, 2021, the entire contents of all of which are hereby incorporated by reference.

TECHNICAL FIELD

The present disclosure relates to a separator and a lithium battery employing the same.

BACKGROUND ART

In accordance with the emergence of various miniaturized, high-performance electronic devices, miniaturization and weight reduction is becoming more important in the field of lithium batteries. In addition, discharge capacity, energy density, and cycle characteristics of lithium batteries are becoming important for application in fields such as electric vehicles. In order to meet the above needs, a lithium battery having high discharge capacity per unit volume, high energy density, and excellent lifespan characteristics is required.

In a lithium battery, a separator is arranged between a positive electrode and a negative electrode to prevent a short circuit. An electrode assembly including a positive electrode, a negative electrode, and a separator arranged between the positive electrode and the negative electrode is wound to have a jelly roll shape, and the jelly roll is roll-pressed in order to improve adhesion between the positive/negative electrode and the separator in the electrode assembly.

Olefin-based polymers are widely used as separators for lithium batteries. Olefin-based polymers have excellent flexibility, but have low strength when immersed in a liquid electrolyte, and may cause a short circuit of a battery due to rapid thermal shrinkage at a high temperature of 100° C. or higher. In order to solve this issue, for example, a separator having a shutdown function added by using polyethylene wax on a porous olefin-based polymer substrate has been proposed. However, the polyethylene wax-coated separator does not maintain the coating layer at a high temperature because the polyethylene wax dissolves, and thus, a contact area of an electrode plate increases and thermal runaway increases.

On the other hand, existing polymer-type separators implement characteristics mainly for enhancing adhesion, and circular-type separators implement characteristics mainly for enhancing thermal resistance.

Therefore, when producing a polymer-type cell for high capacity, a separator capable of implementing excellent electrode plate adhesion while securing thermal resistance needs to be developed.

DESCRIPTION OF EMBODIMENTS

Technical Problem

As aspect is to provide a separator having excellent high thermal resistance characteristics and electrode plate adhesion.

Another aspect is to provide a lithium battery including the separator.

Solution to Problem

According to an aspect, provided is a separator, including:

a porous substrate;

a first coating layer arranged on at least one surface of the porous substrate, the first coating layer including: a binder and inorganic particles, wherein the binder includes a cross-linked product of an aqueous cross-linking reactive poly(vinylamide)-based copolymer, wherein the poly(vinylamide)-based copolymer includes repeating units derived from vinylamide monomers and repeating units derived from cross-linking reactive group-containing monomers, and is cross-linked by the cross-linking reactive groups; and a second coating layer arranged on both surfaces of the porous substrate on which the first coating layer is arranged, the second coating layer including an acrylic copolymer and a polyvinylidene fluoride-based binder in a weight ratio of greater than 1:1 and less than 1:4.

According to another aspect, provided is a lithium battery including the separator.

Advantageous Effects of Disclosure

The separator according to an aspect has high thermal resistance characteristics and enhanced electrode plate adhesion, and therefore, a lithium battery having excellent lifespan characteristics may be provided.

BEST MODE

Figure 1:
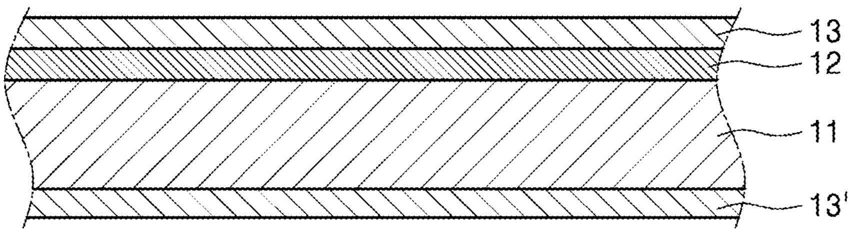
FIG. 1 is a schematic cross-sectional diagram of a separator according to an example embodiment.

The present inventive concept described hereinafter may be modified in various ways, and may have many examples, and thus, certain examples are illustrated in the drawings, and are described in detail in the specification. However, this does not intend to limit the present inventive concept within particular embodiments, and it should be understood that the present disclosure includes all the modifications, equivalents, and replacements within the technical scope of the present inventive concept.

Terms used herein were used to describe particular examples, and not to limit the present inventive concept. As used herein, the singular of any term includes the plural, unless the context otherwise requires. The expression of "include" or "have", used herein, indicates an existence of a characteristic, a number, a phase, a movement, an element, a component, a material, or a combination thereof, and it should not be construed to exclude in advance an existence or possibility of existence of at least one of other characteristics, numbers, movements, elements, components, materials, or combinations thereof. As used herein, "I" may be interpreted to mean "and" or "or" depending on the context.

In the drawings, a thickness is enlarged or reduced to clearly represent various layers and regions. The same reference numerals were attached to similar portions throughout the disclosure. As used herein throughout the disclosure, when a layer, a membrane, a region, or a plate is described to be "on" or "above" something else, it not only includes the case in which it is right above something else but also the case when other portion(s) are present in-between. Terms like "first", "second", and the like may be used to describe various components, but the components are not limited by the terms. The terms are used merely for the purpose of distinguishing one component from other components.

In this specification, a reference to any monomer(s) generally refers to a monomer that may be polymerized with another polymerizable component, such as another monomer or polymer. It is to be understood that, unless otherwise indicated, once a monomeric component reacts with another component to form a compound, the compound will contain a residue of such a component.

The term "polymer", used herein, is intended to refer to prepolymers, oligomers, homopolymers, copolymers, and blends or mixtures thereof.

The expression "combination thereof", used herein, may mean a mixture of constituents, copolymers, blends, alloys, composites, reaction products, and the like.

Hereinafter, a separator according to example embodiments, and a lithium battery employing the same will be described in more detail.

A separator according to embodiments includes:

a porous substrate;

a first coating layer arranged on at least one surface of the porous substrate, the first coating layer including: a binder and inorganic particles, wherein the binder includes a cross-linked product of an aqueous cross-linking reactive poly(vinylamide)-based copolymer, wherein the poly(vinylamide)-based copolymer includes repeating units derived from vinylamide monomers and repeating units derived from cross-linking reactive group-containing monomers, and is cross-linked by the cross-linking reactive groups; and a second coating layer arranged on both surfaces of the porous substrate on which the first coating layer is arranged, the second coating layer including an acrylic copolymer and a polyvinylidene fluoride-based binder in a weight ratio of greater than 1:1 and less than 1:4.

Figure 2:
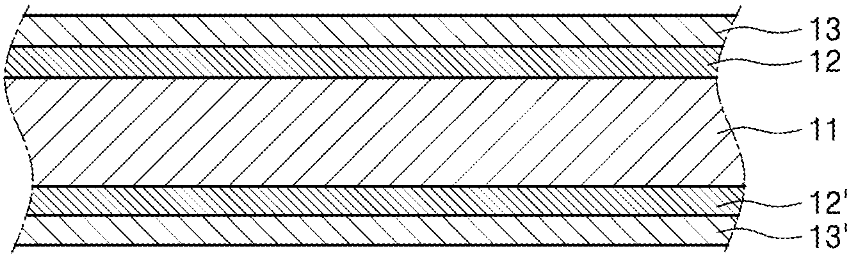
FIG. 2 is a schematic cross-sectional diagram of a separator according to another example embodiment.

Referring to FIGS. 1 and 2, first coating layers 12 and 12' may be arranged on one surface or both surfaces of a porous substrate 11 in a separator, and second coating layers 13 and 13' may be arranged on both surfaces.

The separator may exhibit higher thermal resistance characteristics as compared to existing separators, by forming a first coating layer including a binder including a cross-linked product of an aqueous cross-linking reactive poly(vinylamide)-based copolymer and inorganic particles.

In addition, after forming the first coating layer, by forming second coating layers including an acrylic copolymer and a polyvinylidene fluoride-based binder in a weight ratio of greater than 1:1 and less than 1:4, a second coating is possible without detachment of the first coating layer, and multiple coating layers including the first and second coating layers may be formed in a thickness of 40% or less with respect to a thickness of the entire coated separator. In general, in case a second coating is performed after a first coating, detachment of a first coating layer occurs due to a second coating solution, which may be prevented by using an aqueous cross-linking reactive polyvinylpyrrolidone-based polymer.

The separator, by including the above-described first-coating layer and the second coating layer, may form multiple coating layers with a thickness of 40% or less, with respect to a thickness of the entire separator, and at the same time, may exhibit: high thermal resistance characteristics by which the separator shrinks by 10% or less, when the separator is stored in a liquid electrolyte solution (for example, PC, 1M $LiBF_4$) at 150° C. for 10 minutes; characteristics of a moisture content of 600 ppm or less; and electrode adhesion of 0.4 gf/mm or more.

The separator prepared by using the above-described components may improve lifespan characteristics of a lithium battery.

An aqueous cross-linking reactive poly(vinylamide)-based copolymer included in the first coating layer includes repeating units derived from vinylamide monomers and repeating units derived from cross-linking reactive group-containing monomers, and cross-linking reactions of the repeating units derived from cross-linking reactive group-containing monomers may occur by a cross-linker included in a composition for forming a first coating layer.

According to an example, the vinylamide monomers may be selected from vinylpyrrolidone, vinylcaprolactam, N-vinylformamide, N-vinylacetamide, N-vinyl-N-methylacetamide, and mixtures thereof. For example, the vinylamide monomers may be vinylpyrrolidone.

According to an example, the cross-linking reactive group may include at least one selected from a carboxyl group, an amine group, an isocyanate group, a hydroxyl group, an epoxy group, and an oxazoline group. For example, the cross-linking reactive group may include a carboxyl group.

The cross-linking reactive group-containing monomers may be carboxyl group-containing monomers. For example, the cross-linking reactive group-containing monomers may be carboxylic acid selected from acrylic acid, methacrylic acid, carboxyethyl acrylate, carboxypentyl acrylate, itaconic acid, maleic acid, fumaric acid, crotonic acid, and isocrotonic acid, monovalent metal salts, divalent metal salts, ammonium salts and organic amine salts thereof, and mixtures thereof. For example, the cross-linking reactive group-containing monomers may be acrylic acid, methacrylic acid, or mixtures thereof.

According to an example, the poly(vinylamide)-based copolymer may include repeating units derived from vinylpyrrolidone and repeating units derived from (meth)acrylic acid.

In the poly(vinylamide)-based copolymer, a content of the repeating units derived from cross-linking reactive group-containing monomers may be greater than 0 mol % and less than 50 mol %, for example, about 1 mol % to about 45 mol %, about 5 mol % to about 40 mol %, or about 10 mol % to about 30 mol %, with respect to total moles of monomer components constituting the poly(vinylamide)-based copolymer. By using a poly(vinylamide)-based copolymer having repeating units derived from cross-linking reactive group-containing monomers within the range, a coated separator having high thermal resistance characteristics through cross-linking reactions by cross-linkers may be prepared.

A weight average molecular weight of the poly(vinylamide)-based copolymer may be about 100,000 g/mol to about 1,000,000 g/mol. For example, the weight average molecular weight of the poly(vinylamide)-based copolymer may be about 150,000 g/mol to about 800,000 g/mol, specifically, about 200,000 g/mol to about 700,000 g/mol, and more specifically, about 300,000 g/mol to about 600,000 g/mol. Within the range, it is possible to prepare a coated separator having a low shrinkage rate during storage at a high temperature. For example, within the above range, a coated separator having a shrinkage rate of 5% or less when stored at 150° C. for 1 hour may be manufactured.

The poly(vinylamide)-based copolymer may have a glass transition temperature of 150° C. or higher. For example, the glass transition temperature of the poly(vinylamide)-based copolymer may be about 150° C. to about 300° C., specifically, about 170° C. to about 280° C., and more specifically, about 190° C. to about 250° C. Within the above range, a separator coating layer having high thermal resistance may be formed.

According to an example, the poly(vinylamide)-based copolymer may be an aqueous cross-linking reactive polyvinylidene-acrylic acid-based copolymer.

A content of the poly(vinylamide)-based copolymer may be about 10 wt % to 100 wt %, with respect to a total weight of the binder. For example, the content of the poly(vinylamide)-based copolymer may be about 30 wt % to about 95 wt %, about 50 wt % to about 90 wt %, or about 60 wt % to about 80 wt %, with respect to the total weight of the binder. Within the above range, it is possible to provide a separator having improved thermal resistance and moisture content characteristics.

The first coating layer may further include an aqueous binder commonly used in the art as a binder. Examples of a commonly used aqueous binder include, for example, at least one selected from polyvinyl alcohol, polyvinyl acetate, polyacrylic acid, polyacrylic acid ester, polymethacrylic acid, polymethacrylic acid ester, poly-N-vinylcarboxylic acid amide, polyacrylonitrile, polyether, polyamide, ethylene vinyl acetate copolymer, polyethylene oxide, cellulose acetate, cellulose acetate butylate, cellulose acetate propionate, cyanoethyl pullulan, cyanoethyl polyvinyl alcohol, cyanoethyl cellulose, cyanoethyl sucrose, pullulan, carboxyl methyl cellulose, acrylonitrile styrene butadiene copolymer, and polyimide.

The first coating layer may include a cross-linker in a coating solution for forming the first coating layer, and the cross-linker is not particularly limited, within the range the cross-linker may have cross-linking reactions with a cross-linking reactive group of the aqueous cross-linking reactive poly(vinylamide)-based copolymer. For example, the cross-linker may include at least one selected from ethylene glycol diglycidyl ether, polyethylene glycol diglycidyl ether, glycerol polyglycidyl ether, propylene glycol diglycidyl ether, polypropylene glycol diglycidyl ether, ethylene glycol, diethylene glycol, propylene glycol, triethylene glycol, tetraethylene glycol, propanediol, dipropylene glycol, polypropylene glycol, glycerin, polyglycerin, butanediol, heptanediol, hexanediol, trimethylolpropane, pentaerythricol, and sorbitol.

A content of the cross-linker may be in a range of about 1 part by weight to about 45 parts by weight, with respect to 100 parts by weight of the poly(vinylamide)-based copolymer. A desired level of cross-linking may be induced within the above range, and thus, a first coating layer capable of exhibiting high thermal resistance characteristics may be formed.

Since the first coating layer includes inorganic particles, a possibility of a short circuit between a positive electrode and a negative electrode is reduced, and thus, stability of the battery may be improved. The inorganic particles included in the first coating layer may be a metal oxide, a metalloid oxide, or a combination thereof. Specifically, the inorganic particles may be alumina, titania, boehmite, barium sulfate, calcium carbonate, calcium phosphate, amorphous silica, crystalline glass particles, kaolin, talc, silica-alumina composite oxide particles, calcium fluoride, lithium fluoride, zeolite, molybdenum sulfide, mica, magnesium oxide, and the like. The inorganic particles may be, for example, $Al_2O_3$, $SiO_2$, $TiO_2$, $SnO_2$, $CeO_2$, NiO, CaO, ZnO, MgO, $ZrO_2$, $Y_2O_3$, $SrTiO_3$, $BaTiO_3$, $MgF_2$, $Mg(OH)_2$, or combinations thereof. For example, the inorganic particles may be alumina, titania, boehmite, barium sulfate, or a combination thereof. The inorganic particles may be spherical, plate-like, fibrous, etc., but are not limited thereto, and any form that may be used in the art may be used. Plate-like inorganic particles include, for example, alumina and boehmite. In this case, reduction of a separator area at a high temperature may be further suppressed, relatively large porosity may be secured, and characteristics of a lithium battery may be improved during penetration evaluation. In case the inorganic particles are plate-like or fibrous, the inorganic particles may have an aspect ratio of about 1:5 to about 1:100. For example, the aspect ratio may be about 1:10 to about 1:100. For example, the aspect ratio may be about 1:5 to about 1:50. For example, the aspect ratio may be about 1:10 to about 1:50. On a flat surface of plate-like inorganic particles, a long-to-short axis ratio may be about 1 to about 3. For example, on the flat surface, the long-to-short axis ratio may be about 1 to about 2. For example, on the flat surface, the long-to-short axis ratio may be about 1. The aspect ratio and long-to-short axis ratio may be measured by using a scanning electron microscope (SEM). Within the ranges of the aspect ratio and the long-to-short axis ratio, shrinkage of the separator may be suppressed, relatively improved porosity may be secured, and penetration characteristics of a lithium battery may be improved. In case the inorganic particles are in a form of a plate, an average angle of the flat surface of the inorganic particles with respect to one surface of a porous substrate may be about 0 degrees to about 30 degrees. For example, the angle of the flat surface of the inorganic particles with respect to one surface of the porous substrate may converge to 0 degree. That is, one surface of the porous substrate and the flat surface of the inorganic particles may be parallel. For example, in case the average angle of the flat surface of the inorganic compound with respect to one surface of the porous substrate is within the above range, thermal shrinkage of the porous substrate may be effectively prevented, and a separator with a reduced shrinkage rate may be provided.

An average particle diameter of the inorganic particles included in the first coating layer is about 50 nm to about 2 μm, about 100 nm to about 1.5 μm, or about 150 nm to about 1.0 The average particle diameter of the inorganic particles may be measured by using, for example, a laser diffraction method or a measuring device employing a dynamic light scattering method. The average particle diameter of the inorganic particles is measured by using, for example, a laser scattering particle diameter distribution meter (for example, Horiba's LA-920), and is a value of a median particle diameter (D50) when 50% is accumulated from the side of small particles in volume conversion. Both binding between a first coating layer and a porous substrate and binding between a coating layer and an electrode may be improved by using inorganic particles having an average particle diameter within this range. In addition, by using inorganic particles having an average particle diameter within this range, a separator including a coating layer including the inorganic particles may have appropriate porosity. In case an average particle diameter of the inorganic particles is less than 50 nm, air permeability of the separator may be reduced and moisture content may increase.

In the first coating layer, a weight ratio of a total weight of the binder to a weight of the inorganic particles may be about 0.1:99.9 to about 50:50. For example, the weight ratio of the total weight of the binder to the weight of the inorganic particles may be about 1:99 to about 20:80, or about 3:97 to about 30:70. Within the range, it is possible to provide a separator having excellent substrate binding and excellent thermal resistance.

A first coating layer may further include organic particles. The organic particles may be cross-linked polymers. The organic particles may be highly cross-linked polymers showing no glass transition temperature (Tg). In case a highly cross-linked polymer is used, thermal resistance is improved and shrinkage of the porous substrate at high temperatures may be effectively suppressed. The organic particles may include, for example, styrene-based compounds and derivatives thereof, methyl methacrylate-based compounds and derivatives thereof, acrylate-based compounds and derivatives thereof, diallyl phthalate-based compounds and derivatives thereof, polyimide-based compounds and derivatives thereof, polyurethane-based compounds and derivatives thereof, copolymers thereof, or combinations thereof, but are not limited thereto, and any material that may be used as organic particles in the art may be used. For example, the organic particles may be cross-linked polystyrene particles, or cross-linked polymethyl methacrylate particles. The particles may be secondary particles formed by aggregation of primary particles. In a separator including secondary particles, porosity of a coating layer is increased, and thus, a lithium battery having excellent high output characteristics may be provided.

A first coating layer may be arranged on one surface or both surfaces of a porous substrate.

In the separator, second coating layers are arranged on both surfaces of the porous substrate on which the first coating layer is arranged, and since the second coating layers include an acrylic copolymer and a polyvinylidene fluoride-based binder in a weight ratio of greater than 1:1 and less than 1:4, it is possible to provide a separator having excellent electrode adhesion without detachment of the first coating layer.

The acrylic copolymer included in the second coating layers may be, for example, an acrylic copolymer including repeating units derived from (meth)acrylate monomers. In addition, the acrylic copolymer may further include repeating units derived from acetate group-containing monomers, in addition to repeating units derived from (meth)acrylate monomers. By using an acrylic copolymer having repeating units derived from a (meth)acrylate-based monomers and/or repeating units derived from acetate group-containing monomers as a binder, adhesion with a positive electrode or a negative electrode is increased in a lithium battery, which is an environment in which the binder is actually used, thereby preventing detachment of a separator in an electrode assembly process, reducing a process defect rate, and enabling long-term preservation.

The acrylic copolymer may have a glass transition temperature (Tg) of less than 100° C., for example, about 20° C. to about 60° C., specifically, about 30° C. to about 45° C. Within the above range, it is possible to secure shape stability by forming good adhesion at a temperature at which the separator is compressed between the electrodes.

An acrylic copolymer having repeating units derived from a (meth)acrylate-based monomers, and/or repeating units derived from acetate group-containing monomers that may be used is not particularly limited as long as the acrylic copolymer may form good adhesion at a compression temperature between the positive electrode and the negative electrode, but the acrylic copolymer may be, for example, a copolymer produced by polymerizing one or more (meth) acrylate-based monomers selected from the group consisting of butyl (meth)acrylate, propyl(meth)acrylate, ethyl(meth) acrylate, and methyl(meth)acrylate. Alternatively, the acrylic copolymer may be a copolymer produced by polymerizing at least one kind of (meth)acrylate-based monomers selected from the group consisting of butyl (meth)acrylate, propyl(meth)acrylate, ethyl(meth)acrylate, and methyl (meth)acrylate, and at least one kind of acetate group-containing monomers selected from the group consisting of vinyl acetate, and allyl acetate.

The repeating units derived from acetate group-containing monomers may be repeating units of Formula 1:

Formula 1

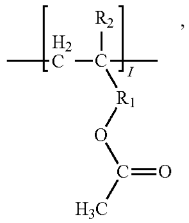

wherein in Formula 1, $R_1$ is a single bond or straight-chain or branched alkyl having 1 to 6 carbon atoms, $R_2$ is hydrogen or methyl, and l is each an integer between 1 and 100.

For example, the repeating units derived from acetate group-containing monomers may be at least one kind of repeating units derived from acetate group-containing monomers selected from the group consisting of vinyl acetate and allyl acetate. The acrylic copolymer may be prepared by polymerizing (meth)acrylate-based monomers or by polymerizing (meth)acrylate-based monomers and other monomers other than (meth)acrylate-based monomers. For example, the other monomers may be acetate group-containing monomers. In this case, the (meth)acrylate-based monomers and other monomers, specifically, acetate group-containing monomers, may be polymerized in a molar ratio of about 3:7 to about 7:3, specifically about 4:6 to about 6:4, more specifically about 5:5, to prepare an acrylic copolymer. The acrylic copolymer may be prepared by, for example, polymerizing butyl (meth)acrylate monomers, methyl(meth) acrylate monomers, and vinyl acetate and/or allyl acetate monomers, in a molar ratio of 3 to 5:0.5 to 1.5:4 to 6, specifically, in a molar ratio of 4:1:5.

The polyvinylidene fluoride (PVdF)-based binder included in the second coating layer may be, for example, at least one selected from polyvinylidenefluoride-hexafluoropropylene (PVDF-HFP), polyvinylidene fluoride-trichloroethylene (PVDF-TCE), and polyvinylidene fluoride-trifluoroethylene (PVDF-CTFE). More specifically, a polyvinylidene fluoride (PVdF) homopolymer, or a polyvinylidene fluoride-hexafluoropropylene copolymer (PVdF-HFP) may be used.

The PVdF-based binder may have a weight average molecular weight (Mw) of about 500,000 g/mol to about 1,500,000 g/mol. In a specific example, the PVdF-based binder may have a weight average molecular weight (Mw) of about 1,000,000 g/mol to about 1,500,000 g/mol. In another example, two or more types having different weight average molecular weights may be mixed and used. For example, one or more types having a weight average molecular weight of 1,000,000 g/mol or less and one or more types having a weight average molecular weight of 1,000,000 g/mol or more may be mixed and used. By using the PVdF-based binder within the above molecular weight range, adhesion between a separator and a porous substrate is strengthened, and heat-induced shrinkage of the porous substrate, which is vulnerable to heat, may be effectively suppressed, and in addition, there is an advantage in that it is possible to prepare a separator with sufficiently improved electrolyte impregnability, and a battery with efficient electrical output may be produced by using the separator.

A weight ratio of the acrylic copolymer and the polyvinylidene fluoride-based binder in the second coating layer may be greater than 1:1 and less than 1:4, for example, from 1:1.5 to 1:3.5, for example, 1:2 to 1:3.5, for example 1:2.5 to 1:3.5. In the above range, it is possible to improve lifespan characteristics of a lithium battery by exhibiting excellent electrode adhesion as well as high thermal resistance.

In the separator, a total thickness of the first coating layer and the second coating layer may be 40% or less of a total thickness of the separator, for example, about 5% to about 40% of the total thickness of the separator. Specifically, for example, a thickness of the coating layer may be in the range of about 10% to about 35%, or about 15% to about 30% of the total thickness of the separator. Thermal resistance of the separator may be improved to a desired level by forming a coating layer having a thickness in the above thickness range.

A porous substrate included by the separator may be a porous membrane including polyolefin. Polyolefin has an excellent effect of preventing a short circuit, and may also improve stability of a battery by a shutdown effect. For example, the porous substrate may be a membrane consisting of polyolefins such as polyethylene, polypropylene, polybutene, and polyvinyl chloride, and resins such as mixtures or copolymers thereof, but is not necessarily limited thereto and any porous membrane used in the art may be used. For example, a porous membrane consisting of a polyolefin-based resin; a porous membrane made by weaving polyolefin-based fibers; a non-woven fabric including polyolefin; and an aggregate of insulating material particles may be used. For example, a porous membrane including polyolefin has excellent coating properties for a binder solution which is used to prepare a coating layer formed on the substrate, and a thickness of the separation membrane may be reduced to increase a proportion of active materials in the battery and to increase capacity per unit volume.

The polyolefin used as a material of the porous substrate may be, for example, a homopolymer, a copolymer, or mixtures thereof of polyethylene or polypropylene. Polyethylene may be low-density, medium-density, or high-density polyethylene, and in regards to mechanical strength, high-density polyethylene may be used. In addition, two or more types of polyethylene may be mixed for a purpose of imparting flexibility. A polymerization catalyst used for preparing polyethylene is not particularly limited, and a Ziegler-Natta catalyst, a Phillips catalyst, a metallocene catalyst, or the like may be used. From a viewpoint of achieving both mechanical strength and high permeability, a weight average molecular weight of polyethylene may be about 100,000 to about 12,000,000, for example, about 200,000 to about 3,000,000. Polypropylene may be a homopolymer, a random copolymer, or a block copolymer, and may be used alone or in combination of two or more thereof. In addition, a polymerization catalyst is not particularly limited, and a Ziegler-Natta catalyst, or a metallocene catalyst may be used. In addition, stereoregularity is not particularly limited, and isotactic, syndiotactic, or atactic polypropylene may be used, but inexpensive isotactic polypropylene may be selected. In addition, polyolefin other than polyethylene or polypropylene and additives such as antioxidants may be be added to the polyolefin within a range that does not impair the effects of the present disclosure.

The porous substrate included in the separator includes, for example, polyolefin such as polyethylene and polypropylene, and a multilayer membrane of two or more layers may be used, and a mixed multilayer membrane such as a polyethylene/polypropylene two-layer separator, a polyethylene/polypropylene/polyethylene three-layer separator, and polypropylene/polyethylene/polypropylene three-layer separator may be used, but is not limited thereto, and any material and configuration that may be used as a porous substrate in the art may be used. The porous substrate included in the separator may include, for example, a diene-based polymer prepared by polymerizing a monomer composition including diene-based monomers. The diene-based monomer may be a conjugated diene-based monomer, or a non-conjugated diene-based monomer. For example, the diene monomer includes at least one selected from the group consisting of 1,3-butadiene, isoprene, 2-chloro-1,3-butadiene, 2,3-dimethyl-1,3-butadiene, 2-ethyl-1,3-butadiene, 1,3-pentadiene, chloroprene, vinylpyridine, vinylnorbornene, dicyclopentadiene, and 1,4-hexadiene, but is not necessarily limited thereto, and any that may be used as a diene-based monomer in the art may be used.

The porous substrate included in the separator may have a thickness of about 1 μm to about 100 For example, a thickness of the porous substrate may be about 1 μm to about 30 μm. For example, a thickness of the porous substrate may be about 5 μm to about 20 For example, a thickness of the porous substrate may be about 5 μm to about 15 For example, a thickness of the porous substrate may be about 5 μm to about 10 In case a thickness of the porous substrate is less than 1 it may be difficult to maintain mechanical properties of the separator, and in case a thickness of the porous substrate is more than 100 internal resistance of the lithium battery may be increased. Porosity of the porous substrate included in the separator may be about 5% to about 95%. In case the porosity is less than 5%, internal resistance of the lithium battery may increase, and in case the porosity is greater than 95%, it may be difficult to maintain mechanical properties of the porous substrate. A pore size of the porous substrate in the separator may be about 0.01 μm to about 50 μm. For example, the pore size of the porous substrate in the separator may be about 0.01 μm to about 20 For example, the pore size of the porous substrate in the separator may be about 0.01 μm to about 10 In case the pore size of the porous substrate is less than internal resistance of the lithium battery may be increased, and in case the pore size of the porous substrate is more than 50 it may be difficult to maintain mechanical properties of the porous substrate.

The separator may be prepared by the following method.

According to an example, the separator may be prepared by a preparation method including:

forming a first coating layer by coating a first coating composition including a binder, which includes the aqueous cross-linking reactive poly(vinylamide)-based copolymer, a cross-linker, inorganic particles, and water on one surface or both surfaces of a porous substrate, and heat-treating; and forming a second coating layer by coating a second coating composition including the acrylic copolymer, the polyvinylidene fluoride-based binder, and water on both surfaces of the porous substrate on which the first coating layer is formed, and heat treating.

The first coating composition includes components of the first coating layer described above, and may be provided in a form of slurry by including water as a solvent capable of dispersing the components. The first coating composition may further include an organic solvent as long as the aqueous characteristics are not impaired. The organic solvent may be an alcohol-based organic solvent. For example, the organic solvent may include at least one selected from the group consisting of methanol, ethanol, propanol, and butanol. By using an alcohol-based organic solvent, it is possible to provide a first coating composition that is harmless to the body and has excellent drying characteristics, thereby securing mass productivity without reducing productivity. According to an example, the water and organic solvent may be included in a volume ratio of about 100:0 to about 60:40. For example, the water and organic solvent may be included in a volume ratio of about 95:5 to about 80:20, specifically, for example, may be included in a volume ratio of about 85:15 to about 70:30. Within the above range, the first coating composition having improved drying characteristics may be provided.

The solvent is volatilized through drying after coating with the first coating composition, and thus, the solvent does not exist in the finally obtained first coating layer of the separator.

First, the first coating composition is coated on one surface or both surfaces of a porous substrate while moving the porous substrate.

A method of coating the first coating composition on one surface or both surfaces of the moving porous substrate is not particularly limited, and for example, at least one selected from a forward roll coating method, a reverse roll coating method, a microgravure coating method, and a direct metering coating method may be used, but is not necessarily limited to these methods. The coating method may be, for example, a direct metering coating method.

Subsequently, the porous substrate coated with the first coating composition is heat treated.

For this, the porous substrate coated with the first coating composition is moved into a dryer.

In the dryer, the porous substrate coated with the first coating composition is dried with hot air, and thus, a separator with a first coating layer arranged on the porous substrate is prepared. The porous substrate coated with the first coating composition is fed to the dryer from one side, dried by hot air in the dryer, and then discharged from the other side of the dryer. In the dryer, hot air is supplied from upper nozzles and lower nozzles arranged alternately or symmetrically on upper and lower portions of the porous substrate coated with the first coating composition.

A moving speed of the porous substrate in the dryer may be the same as a coating speed. In case the moving speed of the porous substrate is too slow, inorganic particles included in the first coating composition are mainly distributed at an interface between the coating layer and the porous substrate, and thus, binding between the coating layer and the porous substrate may be deteriorated. In case the moving speed of the porous substrate is too fast, the inorganic particles in the coating layer are mainly distributed near the surface of the coating layer facing the electrode, and thus, binding between the separator and the electrode may be deteriorated.

A hot air supply rate in the dryer may be, for example, about 10 m/s to about 50 m/s, about 10 m/s to about 40 m/s, about 10 m/s to about 30 m/s, or about 10 m/s to about 20 m/s, and a drying completion rate may be greater than 15 mpm. By having a hot air supply rate and drying completion rate within the ranges, a production speed may be enhanced, and a separator in which bending strength and peel strength are improved at the same time may be manufactured. In case the hot air supply rate is too low, the inorganic particles included in the first coating composition are mainly distributed at an interface between the first coating layer and the porous substrate, and thus, binding between the coating layer and the porous substrate may be deteriorated. In case the hot air supply rate is too high, the inorganic particles in the first coating layer are mainly distributed near the surface of the coating layer facing the electrode, and thus, binding between the separator and the electrode may be deteriorated.

The hot air drying temperature in the dryer may be, for example, about 30° C. to about 80° C., about 35° C. to about 75° C., about 40° C. to about 70° C., or about 45° C. to about 65° C. By having a hot air temperature within this range, a separator having improved bending strength and peel strength at the same time may be manufactured. In case the hot air drying temperature is too low, drying may be incomplete. In case the hot air drying temperature is too high, a uniform coating layer structure may not be obtained due to rapid volatilization of the solvent.

Retention time of the porous substrate in the dryer is, for example, about 10 seconds to about 50 seconds, about 10 seconds to about 45 seconds, about 10 seconds to about 40 seconds, about 10 seconds to about 35 seconds, or about 10 seconds to about 30 seconds. By having a retention time in the dryer within this range, a separator having improved bending strength and peel strength at the same time may be manufactured. In case the retention time of the porous substrate in the dryer is too short, uniform phase separation may not be achieved. In case the retention time of the porous substrate in the dryer is excessively long, the base film may shrink and pores of the entire membrane may shrink.

During hot air drying in the dryer, a non-solvent supplied into the dryer may be at least one selected from water and alcohol. The non-solvent may be, for example, water vapor. The alcohol may be, for example, methanol, ethanol, propanol, and the like.

After forming the first coating layer, a second coating layer is formed by coating a second coating composition including the acrylic copolymer, the polyvinylidene fluoride-based binder, and water, on both surfaces of the porous substrate on which the first coating layer is formed, and heat-treating.

The second coating composition includes components of the second coating layer described above, and may be provided in a form of slurry by including water as a solvent capable of dispersing the components. The second coating composition may further include an organic solvent as long as the aqueous characteristics are not impaired. The organic solvent may be an alcohol-based organic solvent. For example, the organic solvent may include at least one selected from the group consisting of methanol, ethanol, propanol, and butanol. By using an alcohol-based organic solvent, it is possible to provide a second coating composition that is harmless to the body and has excellent drying characteristics, thereby securing mass productivity without reducing productivity. According to an example, the water and organic solvent may be included in a volume ratio of about 100:0 to about 60:40. For example, the water and organic solvent may be included in a volume ratio of about 95:5 to about 80:20, specifically, for example, may be included in a volume ratio of about 85:15 to about 70:30. Within the above range, the second coating composition having improved drying characteristics may be provided.

The solvent is volatilized through drying after coating with the second coating composition, and thus, the solvent does not exist in the finally obtained second coating layer of the separator.

Since the second coating composition includes the acrylic copolymer and the polyvinylidene fluoride-based binder, the second coating may be performed without detachment of the first coating layer by using the second coating composition.

As for a heat treatment method after coating the second coating composition, the above-described heat treatment method applied when forming the first coating layer may be applied.

A separator including the above-described first coating layer and the second coating layer may have very good physical properties such that a number of black dots per unit area (1 m2) is less than 0.04. The separator may have a number of black dots per unit area (1 $m^2$) of 0.003 or less, 0.002 or less, or 0.001 or less.

An electrode assembly including the separator arranged between a positive electrode and a negative electrode, and wound into a jelly roll shape may have bending strength of 460 N or more and peel strength of 0.3 N/m or more. As the separator exhibits bending strength of 460 N or more and peel strength of 0.3 N/m or more, energy density and cycle characteristics of a lithium battery including the separator may be improved.

The first and second coating layers may each independently have, for example, a single-layer structure or a multi-layer structure. For example, each coating layer may be arranged only on one surface of the porous substrate and may not be arranged on the other surface. Also, each coating layer may have a multilayer structure. In a multi-layered coating layer, layers selected from organic layers, inorganic layers, and organic-inorganic layers may be arbitrarily arranged. The multi-layer structure may be a two-layer structure, a three-layer structure, or a four-layer structure, but is not necessarily limited to such a structure and may be selected according to required characteristics of the composite separator. Coating layers may be, for example, arranged on both surfaces of the porous substrate. The coating layers respectively arranged on both surfaces of the porous substrate may each independently be an organic layer, an inorganic layer, or an organic-inorganic layer, and at least one thereof includes the above-described composition for coating a separator. In addition, at least one of the coating layers respectively arranged on both surfaces of the porous substrate may have a multilayer structure. In a multi-layered coating layer, layers selected from organic layers, inorganic layers, and organic-inorganic layers may be arbitrarily arranged. The multi-layer structure may be a two-layer structure, a three-layer structure, or a four-layer structure, but is not necessarily limited to such a structure and may be selected according to required characteristics of the composite separator.

The first and second coating layers included in the separator may each independently include, for example, about 0.3 to about 0.4 pores with a diameter of about 500 nm to about 1,000 nm per 1 $\mu m^2$, and about 0.5 to about 1.5 pores with a diameter of less than 500 nm per 1 $\mu m^2$. A pore with a diameter of about 500 nm to about 1,000 nm per 1 $\mu m^2$ is, for example, a large-diameter pore, and a pore with a diameter of less than 500 nm per 1 $\mu m^2$ is, for example, a small-diameter pore. In case a separator has a number of large-diameter pores and a number of small-diameter pores within the ranges, the separator may provide balanced air permeability.

In case the number of large-diameter pores included in the separator is less than 0.3 and the number of small-diameter pores is greater than 0.15, air permeability of the separator is excessively increased. Accordingly, internal resistance of the separator impregnated with a liquid electrolyte increases, and thus, cycle characteristics of a lithium battery including the separator may deteriorate. In case the number of large-diameter pores included in the separator is more than 0.4 and the number of small-diameter pores is less than 0.5, air permeability of the separator is excessively decreased. Therefore, it is difficult for the separator to suppress growth of lithium dendrites generated during charging/discharging processes, and a possibility of a short circuit or the like of the lithium battery including the separator increases. The air permeability is, for example, Gurley air permeability measured by measuring time required for 100 cc of air to pass through a separator according to JIS P-8117.

A surface of a coating layer included in a separator may have a morphology including, for example, a plurality of pores in a form of islands discontinuously arranged on a polymer membrane. The surface of the coating layer included in the separator may show a morphology in which a plurality of pores is discontinuously arranged on the polymer membrane. The surface of the coating layer is basically made of a polymer membrane, and may have a morphology in which pores are irregularly arranged in a form of islands on the polymer membrane. In case the coating layer included in the separator has such a morphology, bending strength and peel strength of the separator may be improved. As a result, energy density and cycle characteristics of a lithium battery including the separator may be improved. In contrast, a surface of a coating layer included in a separator in the art does not show a polymer membrane, and shows a morphology in which a plurality of fine particles is connected to each other to form a porous surface.

Porosity of each coating layer may be about 30% to about 90%, about 35% to about 80%, or about 40% to about 70%. In case the coating layer has porosity within this range, an increase in internal resistance of the separator may be prevented, and excellent membrane strength may be provided while having excellent high-rate characteristics. The porosity of the coating layer is a volume occupied by pores in the total volume of the coating layer.

An application amount of each coating layer may be, for example, about 1.0 $g/m^2$ to about 4.5 $g/m^2$, about 1.2 $g/m^2$ to about 4.5 $g/m^2$, about 1.5 $g/m^2$ to about 4.5 $g/m^2$, or about 1.7 $g/m^2$ to about 4.5 $g/m^2$. In case the application amount of the coating layer is within this range, the separator including the coating layer may simultaneously provide improved thermal resistance, peel strength, and bending strength. In case the application amount of the coating layer is too small, improved bending strength and peel strength may not be obtained.

A binder included in each coating layer may not have a concentration gradient in which a concentration of the binder increases in a direction from an interface in contact with a porous substrate of the porous layer to a surface facing the electrode. For example, the binder may have a concentration gradient in which a concentration of the binder reduces from an interface in contact with the porous substrate of the porous layer to the surface facing the electrode, or a concentration gradient with no tendency to change in concentration.

A lithium battery according to another embodiment includes a positive electrode, a negative electrode, and the above-described separator arranged between the positive electrode and the negative electrode. According to an example, the lithium battery includes an electrode assembly including a positive electrode, a negative electrode, and the above-described separator arranged between the positive electrode and the negative electrode, and the electrode assembly may have a form wound into a jelly roll shape. As a lithium battery includes the above-described separator, black spot defects may be reduced and therefore, quality may be improved, and since adhesive force between an electrode (positive electrode and negative electrode) and a separator increases, a volume change during charging and discharging of the lithium battery may be suppressed. Accordingly, deterioration of a lithium battery accompanying a volume change of the lithium battery may be suppressed, and lifespan characteristics of the lithium battery may be improved.

A lithium battery may be manufactured, for example, in the following way.

First, a negative electrode composition is prepared by mixing a negative active material, a conductive material, a binder, and a solvent. The negative active material composition may be directly coated on a metal current collector to prepare a negative electrode plate. Alternatively, the negative active material composition may be cast on a separate support and then a film separated from the support may be laminated on a metal current collector to prepare a negative electrode plate. The negative electrode is not limited to the above-described forms, but may have a form other than the forms.

The negative active material may be a carbon-based material. For example, the carbon-based material may be crystalline carbon, amorphous carbon, or mixtures thereof. The crystalline carbon may be graphite such as amorphous, plate-like, flake-like, spherical, or fibrous natural graphite or artificial graphite, and the amorphous carbon may be soft carbon (low-temperature calcined carbon), or hard carbon, mesophase pitch carbide, calcined coke, and the like.

In addition, a composite of the carbon-based material and a non-carbon-based material may be used as the negative active material, and a non-carbon-based material may be additionally included in addition to the carbon-based material.

For example, the non-carbon-based material may include at least one selected from the group consisting of a metal capable of forming an alloy with lithium, an alloy of a metal capable of forming an alloy with lithium, and an oxide of a metal capable of forming an alloy with lithium.

For example, the metals alloyable with lithium may be Si, Sn, Al, Ge, Pb, Bi, Sb, and Si—Y alloy (Y may be an alkali metal, alkaline earth metal, group 13 to 16 element, transition metal, rare earth element, or a combination thereof, and is not Si), Sn—Y alloy (Y may be an alkali metal, alkaline earth metal, group 13 to 16 element, transition metal, rare earth element, or a combination thereof, and is not Sn), and the like. The element Y may be, for example, Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or a combination thereof.

For example, the transition metal oxide may be lithium titanium oxide, vanadium oxide, or lithium vanadium oxide.

For example, the non-transition metal oxide may be $SnO_2$, $SiO_x$ ($0<x<2$), etc.

Specifically, the negative active material may be at least one selected from the group consisting of Si, Sn, Pb, Ge, Al, SiOx($0<x\leq2$), SnOy($0<y\leq2$), Li4Ti5O12, TiO2, LiTiO3, Li2Ti3O7, but is not limited thereto, and any non-carbon-based negative active material used in the art may be used.

As a conductive material, acetylene black, ketjen black, natural graphite, artificial graphite, carbon black, acetylene black, carbon fiber, metal powder such as copper, nickel, aluminum, or silver may be used, and one kind, or a mixture of one or more kinds of conductive materials such as polyphenylene derivatives may be used, but it is not limited thereto, and any material that may be used as a conductive material in the art may be used. In addition, the above-described crystalline carbon-based material may be added as a conductive material.

Examples of the binder include vinylidene fluoride/hexafluoropropylene copolymer, polyvinylidene fluoride (PVDF), polyacrylonitrile, polymethylmethacrylate, polytetrafluoroethylene (PTFE), mixtures thereof, or styrene butadiene rubber-based polymer or the like, but it is not necessarily limited thereto, and any binder used in the art may be used.

N-methylpyrrolidone, acetone, or water may be used as the solvent, but the solvent is not limited thereto, and any solvent that may be used in the art may be used.

Contents of the negative active material, conductive material, binder, and solvent are levels commonly used in lithium batteries. Depending on an intended use and configuration of the lithium battery, one or more of the conductive material, binder, and solvent may be omitted.

Meanwhile, the binder used for preparing the negative electrode may be the same as the separator coating composition included in the coating layer of the separator.

Next, a positive electrode composition is prepared by mixing a positive active material, a conductive material, a binder, and a solvent. The positive active material composition may be directly coated on a metal current collector to prepare a positive electrode plate. Alternatively, the positive active material composition may be cast on a separate support and then a film separated from the support may be laminated on a metal current collector to prepare a positive electrode plate.

At least one selected from lithium cobalt oxide, lithium nickel cobalt manganese oxide, lithium nickel cobalt aluminum oxide, lithium iron phosphate, and lithium manganese oxide may be included as a positive active material, but the positive active material is not limited thereto, and all that may be used as a positive active material in the art may be used.

For example, a compound represented by any one of the following formulas may be used: $Li_aA_{1-b}B_bD_2$ (wherein $0.90\leq a\leq1.8$, and $0\leq b\leq0.5$); $Li_aE_{1-b}B_bO_{2-c}D$, (wherein $0.90\leq a\leq1.8$, $0\leq b\leq0.5$, and $0\leq c\leq0.05$); $LiE_{2-b}B_bO_{4-c}D_c$ (wherein $0\leq b\leq0.5$, and $0\leq c\leq0.05$); $Li_aNi_{1-b-c}Co_bB_cD_\alpha$ (wherein $0.90\leq a\leq1.8$, $0\leq b\leq0.5$, $0\leq c\leq0.05$, and $0\leq\alpha\leq2$); $Li_aNi_{1-b-c}Co_bB_cO_{2-\alpha}F_\alpha$ (wherein $0.90\leq a\leq1.8$, $0\leq b\leq0.5$, $0\leq c\leq0.05$, and $0\leq\alpha\leq2$); $Li_aNi_{1-b-c}Co_bB_cO_{2-\alpha}F_2$ (wherein $0.90\leq a\leq1.8$, $0\leq b\leq0.5$, $0\leq c\leq0.05$, and $0\leq\alpha\leq2$); $Li_aNi_{1-b-c}Mn_bB_cD_\alpha$ (wherein $0.90\leq a\leq1.8$, $0\leq b\leq0.5$, $0\leq c\leq0.05$, and $0\leq\alpha\leq2$); $Li_aNi_{1-b-c}Mn_bB_cO_{2-\alpha}F_2$ (wherein $0.90\leq a\leq1.8$, $0\leq b\leq0.5$, $0\leq c\leq0.05$, and $0\leq\alpha\leq2$); $Li_aNi_{1-b-c}Mn_bB_cO_{2-\alpha}F_2$ (wherein $0.90\leq a\leq1.8$, $0\leq b\leq0.5$, $0\leq c\leq0.05$, and $0\leq a\leq2$); $Li_aNi_bE_cG_dO_2$ (wherein $0.90\leq a\leq1.8$, $0\leq b\leq0.9$, $0\leq c\leq0.5$, and $0.001 \le d \le 0.1$.); $Li_aNi_bCo_cMn_dGeO_2$ (wherein $0.90 \le a \le 1.8$, $0 \le b \le 0.9$, $0 \le c \le 0.5$, $0 \le d \le 0.5$, and $0.001 \le e \le 0.1$); $Li_aNiG_bO_2$ (wherein $0.90 \le a \le 1.8$, and $0.001 \le b \le 0.1$); $Li_aCoG_bO_2$ (wherein $0.90 \le a \le 1.8$, and $0.001 \le b \le 0.1$); $Li_aMnG_bO_2$ (wherein $0.90 \le a \le 1.8$, and $0.001 \le b \le 0.1$); $Li_aMn_2G_bO_4$ (wherein $0.90 \le a \le 1.8$, and $0.001 \le b \le 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$.

In these formulas, A may be Ni, Co, Mn, or a combination thereof; B may be Al, Ni, Co, Mn, Cr, Fe, Mg, Sr, V, a rare earth element, or a combination thereof; D may be O, F, S, P, or a combination thereof; E may be Co, Mn, or a combination thereof; F may be F, S, P, or a combination thereof; G may be Al, Cr, Mn, Fe, Mg, La, Ce, Sr, V, or a combination thereof; Q may be Ti, Mo, Mn, or a combination thereof; I may be Cr, V, Fe, Sc, Y, or a combination thereof; and J may be V, Cr, Mn, Co, Ni, Cu, or a combination thereof.

A compound with a coating layer on a surface of the above-mentioned compound may be used, or a mixture of the above-mentioned compound and the compound with a coating layer may be used. The coating layer may include a compound of a coating element, such as an oxide of a coating element, a hydroxide of a coating element, an oxyhydroxide of a coating element, an oxycarbonate of a coating element, or a hydroxycarbonate of a coating element. Compounds constituting the coating layer may be amorphous or crystalline. As the coating element included in the coating layer, Mg, Al, Co, K, Na, Ca, Si, Ti, V, Sn, Ge, Ga, B, As, Zr, or mixtures thereof may be used. In a process of forming the coating layer, any coating method (for example, spray coating, an immersion method, etc.) may be used as long as the compound may be coated in a way that does not adversely affect physical properties of the positive active material by using these elements, and since this may be well understood by those skilled in the art, a detailed description thereof will be omitted.

For example, $LiNiO_2$, $LiCoO_2$, $LiMn_xO_{2x}$ (x=1, 2), $LiNi_{1-x}Mn_xO_2$ (0<x<1), $LiNi_{1-x-y}Co_xMn_yO_2$ ($0 \le x \le 0.5$, and $0 \le y \le 0.5$), $LiFeO_2$, $V_2O_5$, TiS, MoS, etc. may be used.

In the positive active material composition, the conductive material, the binder, and the solvent may be the same as those in the negative active material composition. Meanwhile, it is also possible to form pores inside the electrode plate by adding a plasticizer to the positive active material composition and the negative active material composition.

Contents of the positive active material, conductive material, general binder, and solvent are levels commonly used in lithium batteries. Depending on an intended use and configuration of the lithium battery, one or more of the conductive material, binder, and solvent may be omitted.

Meanwhile, the binder used for preparing the positive electrode may be the same as the separator coating composition included in the coating layer of the separator.

Next, the above-described separator is inserted between the positive electrode and the negative electrode.

In an electrode assembly including a positive electrode/separator/negative electrode, the separator arranged between the positive electrode and the negative electrode includes a porous substrate; and a coating layer arranged on both surfaces of the porous substrate, as described above, wherein the coating layer includes a dried cross-linked product of the above-described separator coating composition.

A separator may be separately prepared and arranged between the positive electrode and the negative electrode. Alternatively, the separator may be prepared by: winding the electrode assembly including the positive electrode/separator/negative electrode into a jelly roll shape, then accommodating the jelly roll in a battery case or pouch; pre-charging the jelly roll accommodated in a battery case or pouch while thermally softening the jelly roll under pressure; hot-rolling the charged jelly roll; cold-rolling the filled jelly roll; and going through a formation process of charging and discharging the charged jelly roll under pressure.

Next, an electrolyte is prepared.

The electrolyte may be in a liquid or gel state.

For example, the electrolyte may be an organic liquid electrolyte. Also, the electrolyte may be solid. The electrolyte may be, for example, a boron oxide, lithium oxynitride, and the like, but is not limited thereto, and all that may be used as a solid electrolyte in the related art may be used. The solid electrolyte may be formed on the negative electrode by a method such as sputtering.

For example, an organic liquid electrolyte may be prepared. The organic liquid electrolyte may be prepared by dissolving a lithium salt in an organic solvent.

For the organic solvent, all that may be used as an organic solvent in the art may be used. The organic solvent may be, for example, propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, methyl propionate, ethyl propionate, propyl propionate, benzonitrile, acetonitrile, tetrahydrofuran, 2-methyltetrahydrofuran, γ-butyrolactone, dioxolane, 4-methyldioxolane, N,N-dimethylformamide, N,N-dimethylacetamide, dimethyl sulfoxide, dioxane, 1,2-dimethoxyethane, sulfolane, dichloroethane, chlorobenzene, nitrobenzene, diethylene glycol, dimethyl ether, or mixtures thereof.

For the lithium salt, all that may be used as a lithium salt in the art may be used. The lithium salt may be, for example, $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (x and y are natural numbers), LiCl, LiI, or mixtures thereof.

Figure 3:
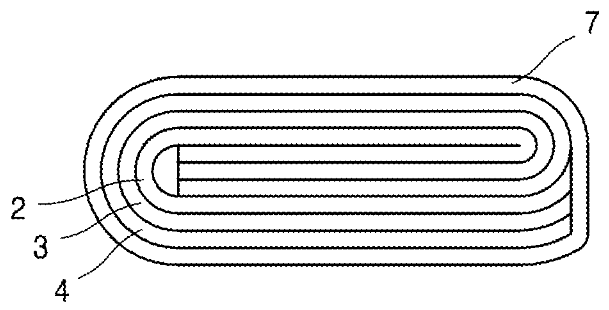
FIG. 3 is a schematic diagram of a lithium battery including an electrode assembly wound into a flat jelly roll shape, according to an example embodiment.

As shown in FIG. 3, the lithium battery 1 includes a positive electrode 3, a negative electrode 2, and a composite separator 4. After the positive electrode 3, the negative electrode 2, and the separator 4 are wound into an electrode assembly in a flat jelly roll shape, the electrode assembly is accommodated in a pouch 7. Then, an organic electrolyte is injected into the pouch 7 and the pouch is sealed to complete the lithium battery 1.

Figure 4:
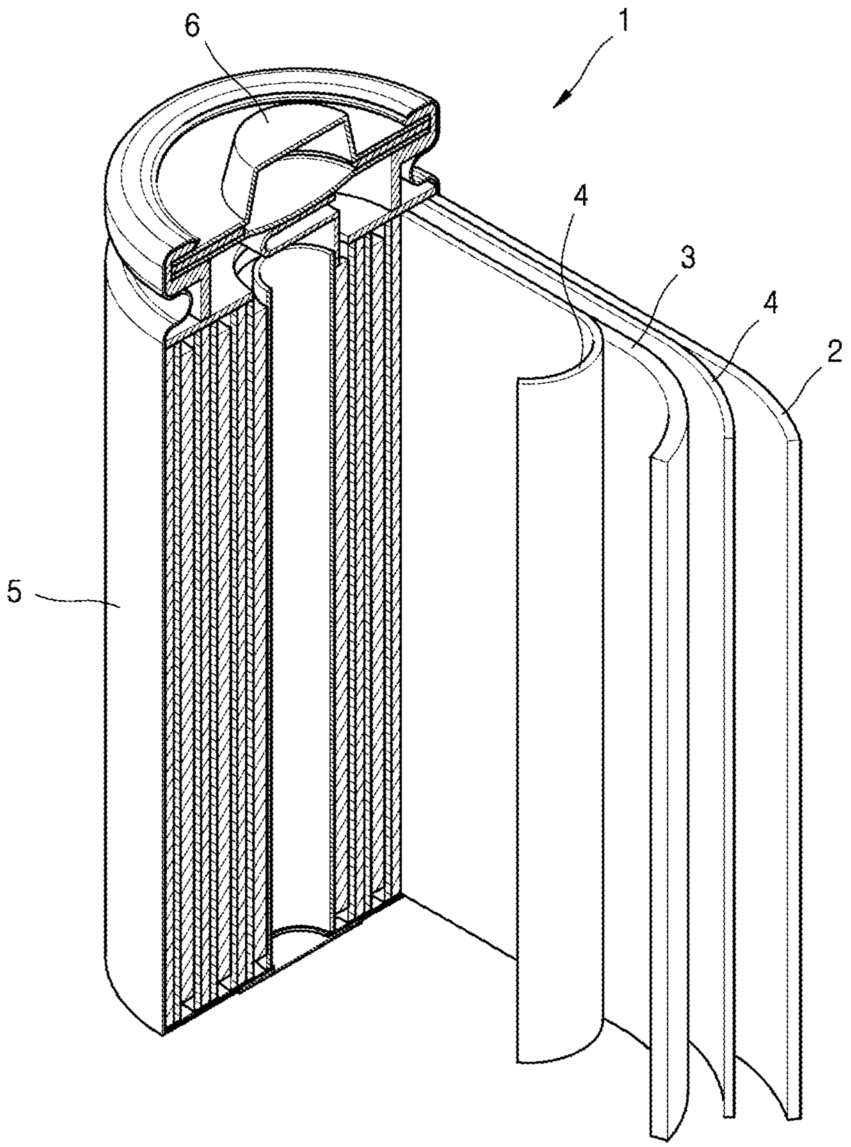
FIG. 4 is a schematic diagram of a lithium battery including an electrode assembly wound into a cylindrical jelly roll shape, according to an example embodiment.
Figure 5:
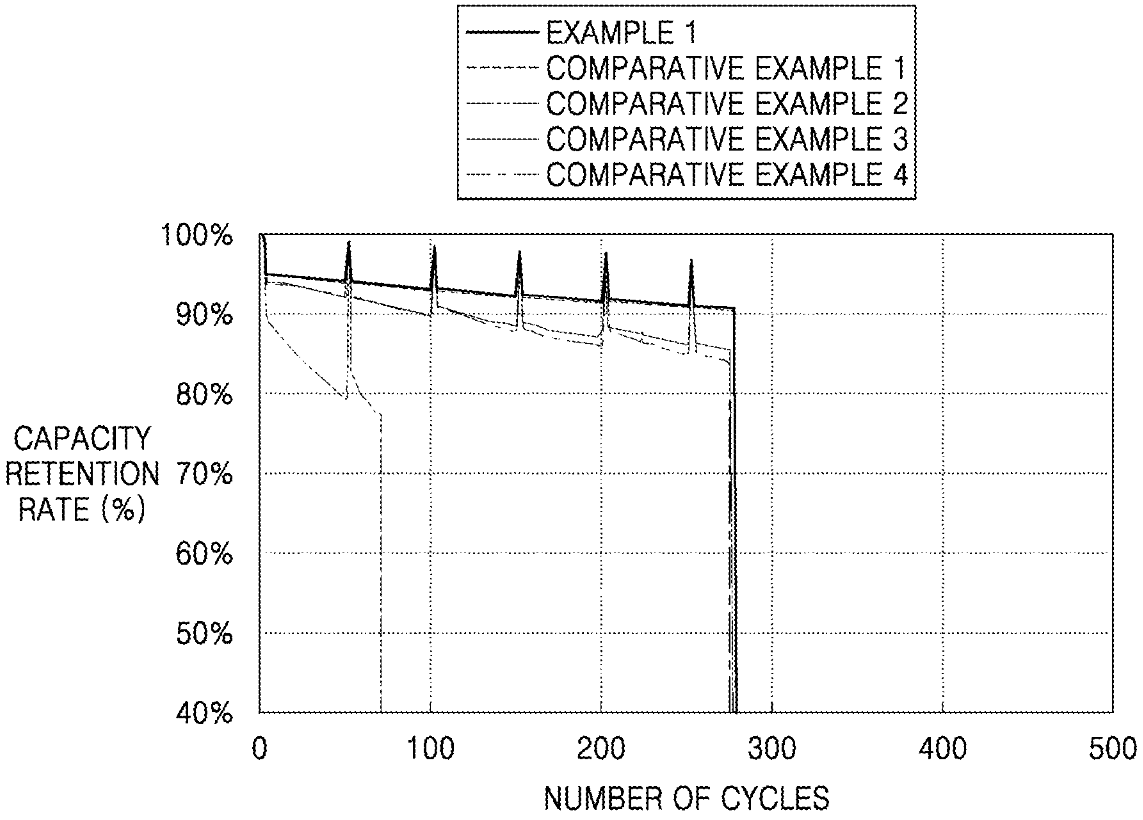
FIG. 5 is a graph showing results of evaluating lifespan characteristics of lithium batteries employing Example 1 and Comparative Examples 1 to 4.

As shown in FIG. 4, the lithium battery 1 includes a positive electrode 3, a negative electrode 2, and a separator 4. After the positive electrode 3, the negative electrode 2, and the separator 4 are wound into an electrode assembly in a cylindrical jelly roll shape, the electrode assembly is accommodated in a battery case 5. Subsequently, an organic liquid electrolyte is injected into the battery case 5 and the battery case is sealed with a cap assembly 6 to complete a lithium battery 1. The battery case may be a cylindrical shape, a prismatic shape, or a thin film type. The lithium battery may be a lithium-ion battery. The lithium battery may be a lithium-polymer battery.

Since the lithium battery is excellent in high-rate characteristics and lifespan characteristics, the lithium battery is suitable to be used in electrical vehicles (EV). For example, the lithium secondary battery may be suitable for a hybrid vehicle such as a plug-in hybrid electric vehicle (PHEV).

Mode of Disclosure

The present inventive concept is explained in more detail through the following examples and comparative examples.

However, the examples are for exemplifying the present inventive concept, and the scope of the present inventive concept is not limited thereto.

(Preparation of Separator)

Example 1: Aqueous Cross-Linking Binder, Acrylic:PVdF-Based=1:3 Applied in Electrode Adhesion Layer, Thickness of Coating Layer 3 μm A first coating solution was prepared by mixing 9.52 wt % of boehmite (ACTILOX 200SM, Nabaltec) with an average particle diameter of 0.3 μm (D50 by volume), 0.30 wt % of a cross-linking reactive polyvinylpyrrolidone-acrylic acid-based copolymer (Mw 300,000), in which a content of acrylic acid monomers is 10 mol % based on the total moles of monomer components constituting the copolymer, 0.03 wt % of ethylene glycol diglycidyl ether as a crosslinker, 0.14 wt % of PVA (Daejeong Chemical, Mw 22,000), and 90.01 wt % of DI water.

Meanwhile, a second coating solution for electrode adhesion was prepared by mixing 4.72 wt % of a polyvinylidene fluoride (PVdF)-based binder, 1.57 wt % of an acrylic binder, wt % of PVA, and 93.5 wt % of Di water. Here, the polyvinylidene fluoride (PVdF) binder was XPH-838LCS LATEX (SOLEF®), and the acrylic binder was BM-2510 (ZEON).

The first coating solution was coated on a cross-section of a 8 μm thick polyethylene porous substrate (CZMZ, NW05535) by a bar coating method, and then dried under conditions of a temperature of 80° C. and an air supply rate of 15 m/sec to form a 2 μm thick coating layer. Then, both surfaces of the porous substrate were coated in the same manner by using the second coating solution to form electrode adhesion layers each having a thickness of 0.5 μm, and thus, a coated separator having a total thickness of 11 μm was prepared.

Comparative Example 1: Non-Cross-Linking CMC Binder, Acrylic:PVdF-Based=1:3 Applied in Electrode Adhesion Layer, Thickness of Coating Layer 3 μm A first coating solution was prepared by mixing 9.52 wt % of boehmite (ACTILOX 200SM, Nabaltec) with D50 of 0.3 μm, 0.33 wt % of carboxymethylcellulose (CMC) sodium salt (medium viscosity, Sigma Aldrich), 0.14 wt % of PVA (Daejeong Chemical, Mw 22,000), and 90.01 wt % of DI water.

Meanwhile, a second coating solution for electrode adhesion was prepared by mixing 4.72 wt % of a polyvinylidene fluoride (PVdF)-based binder, 1.57 wt % of an acrylic binder, wt % of PVA, and 93.5 wt % of Di water.

After forming a 2 μm thick coating layer on a cross-section of a 8 μm thick polyethylene porous substrate (CZMZ, NW05535) by using the first coating solution, electrode adhesion layers each having a thickness of 0.5 μm were formed on both surfaces of the porous substrate by using the second coating solution, and thus, a coated separator having a total thickness of 11 μm was prepared.

Comparative Example 2: Aqueous Cross-Linking Binder, Acrylic:PVdF-Based=1:1

Applied in Electrode Adhesion Layer, Thickness of Coating Layer 3 μm A first coating solution was prepared by mixing 9.52 wt % of boehmite (ACTILOX 200SM, Nabaltec) with D50 of 0.3 μm, 0.30 wt % of a cross-linking reactive polyvinylpyrrolidone-acrylic acid-based copolymer (Mw 300,000), in which a content of acrylic acid monomers is 10 mol % based on the total moles of monomer components constituting the copolymer, 0.03 wt % of ethylene glycol diglycidyl ether as a crosslinker, wt % of PVA (Daejeong Chemical, Mw 22,000), and 90.01 wt % of DI water.

Meanwhile, a second coating solution for electrode adhesion was prepared by mixing 3.15 wt % of a polyvinylidene fluoride (PVdF)-based binder, 3.15 wt % of an acrylic binder, wt % of PVA, and 93.5 wt % of Di water.

After forming a 2 μm thick coating layer on a cross-section of a 8 μm thick polyethylene porous substrate (CZMZ, NW05535) by using the first coating solution, electrode adhesion layers each having a thickness of 0.5 μm were formed on both surfaces of the porous substrate by using the second coating solution, and thus, a coated separator having a total thickness of 11 μm was prepared.

Comparative Example 3: Aqueous Cross-Linking Binder, Acrylic:PVdF-Based=1:4 Applied in Electrode Adhesion Layer, Thickness of Coating Layer 3 μm A first coating solution was prepared by mixing 9.52 wt % of boehmite (ACTILOX 200SM, Nabaltec) with D50 of 0.3 μm, 0.30 wt % of a cross-linking reactive polyvinylpyrrolidone-acrylic acid-based copolymer (Mw 300,000), in which a content of acrylic acid monomers is 10 mol % based on the total moles of monomer components constituting the copolymer, 0.03 wt % of ethylene glycol diglycidyl ether as a crosslinker, wt % of PVA (Daejeong Chemical, Mw 22,000), and 90.01 wt % of DI water.

Meanwhile, a second coating solution for electrode adhesion was prepared by mixing 5.03 wt % of a polyvinylidene fluoride (PVdF)-based binder, 1.26 wt % of an acrylic binder, 0.21 wt % of PVA, and 93.5 wt % of Di water.

After forming a 2 μm thick coating layer on a cross-section of a 8 μm thick polyethylene porous substrate (CZMZ, NW05535) by using the first coating solution, electrode adhesion layers each having a thickness of 0.5 μm were formed on both surfaces of the porous substrate by using the second coating solution, and thus, a coated separator having a total thickness of 11 μm was prepared.

Comparative Example 4: Aqueous Cross-Linking Binder, Acrylic:PVdF-Based=1:5 Applied in Electrode Adhesion Layer, Thickness of Coating Layer 3 μm A first coating solution was prepared by mixing 9.52 wt % of boehmite (ACTILOX 200SM, Nabaltec) with D50 of 0.3 μm, 0.30 wt % of a cross-linking reactive polyvinylpyrrolidone-acrylic acid-based copolymer (Mw 300,000), in which a content of acrylic acid monomers is 10 mol % based on the total moles of monomer components constituting the copolymer, 0.03 wt % of ethylene glycol diglycidyl ether as a crosslinker, wt % of PVA (Daejeong Chemical, Mw 22,000), and 90.01 wt % of DI water.

Meanwhile, a second coating solution for electrode adhesion was prepared by mixing 5.24 wt % of a polyvinylidene fluoride (PVdF)-based binder, 1.05 wt % of an acrylic binder, 0.21 wt % of PVA, and 93.5 wt % of Di water.

After forming a 2 μm thick coating layer on a cross-section of a 8 μm thick polyethylene porous substrate (CZMZ, NW05535) by using the first coating solution, electrode adhesion layers each having a thickness of 0.5 μm were formed on both surfaces of the porous substrate by using the second coating solution, and thus, a coated separator having a total thickness of 11 μm was prepared.

Evaluation Example 1: Evaluation of High Temperature Thermal Shrinkage Rate Characteristics A method of measuring a thermal shrinkage rate of a separator is not particularly limited, and a method commonly used in the technical field of the present disclosure may be used. A non-limiting example of a method of measuring a heat shrinkage rate of a separator is as follows: the separators prepared in Example 1 and Comparative Examples 1 to 4 were each cut to a size of about 10 cm in width (MD) and about 10 cm in length (TD); the cut separators were stored in a chamber at 150° C. for 1 hour; degrees of shrinkage of the separators in the MD direction and TD direction were measured, and an MD direction thermal shrinkage rate and a TD direction thermal shrinkage rate were calculated by Equations 2 and 3, respectively; and between the MD direction thermal shrinkage rate and the TD direction thermal shrinkage rate, a higher value was calculated as the final value and shown in Table 1 below.

MD direction thermal shrinkage rate=(length reduced in MD direction after high temperature shrinkage evaluation/length of separator in MD direction before evaluation)×100     <Equation 2>

TD direction thermal shrinkage rate=(length reduced in TD direction after high temperature shrinkage evaluation/length of separator in TD direction before evaluation)×100     <Equation 3>

Values calculated by Equations 2 and 3 are shown in Table 1 below.

Evaluation Example 1: Evaluation of Electrolyte Impregnation Thermal Shrinkage Rate The separators prepared in Example 1 and Comparative Examples 1 to 4 were cut into a size of about 10 cm in width (MD) and about 10 cm in length (TD), respectively, and impregnated with a propylene carbonate (PC) electrolyte solution in which 1 M of $LiBF_4$ was dissolved, and then, stored in a chamber at 150° C. for 10 minutes. Then, as in Evaluation Example 1, an MD direction thermal shrinkage rate and a TD direction thermal shrinkage rate were calculated, respectively, and the calculated values are shown in Table 1 below.

Evaluation Example 3: Evaluation of Moisture Content

Moisture contents of the separators prepared in Example 1 and Comparative Examples 1 to 4 were measured according to the Karl-Fischer measurement method, and the results are shown in Table 1 below. Moisture contents were measured at 85° C. for 12 hours.

Evaluation Example 4: Evaluation of Electrode Adhesion

After overlapping the separators fabricated in Example 1 and Comparative Examples 1 to 4 with a separator fabric, samples were produced by cutting into a size of 25 mm in width and 80 mm in length. In this regard, the fabric was placed on the opposite side of a coated surface of a separator to be measured. The samples were placed between positive electrodes cut into a size of 35 mm in width and 80 mm in length, and then inserted into a pouch. After adding liquid electrolyte, the pouch was pressed with a specific pressure at a specific temperature. After peeling off a positive electrode from a side of the sample, about 10 mm to about 20 mm of the separator was separated and then fixed to an upper grip, and the remaining positive electrode plate was fixed to a lower grip at a distance of 40 mm, and then the sample was peeled by pulling in a 180° direction. In this regard, a peeling speed was set to 100 mm/min, and force required to peel a section of 20 mm to 40 mm after starting to peel was measured three times, and an average value of the force was taken. Results of measuring peel strengths are shown in Table 1 below.

TABLE 1

| | Thermal shrinkage (150° C., 60 minutes) | | Liquid electrolyte impregnation thermal shrinkage rate (PC (1M $LiBF_4$), 150° C., 10 minutes) | | Moisture content (85° C., 12 hours, ppm) | Electrode adhesion (gf/mm) | Lifespan (Capacity retention rate %, 280 cycles) |
|---|---|---|---|---|---|---|---|
| | MD (%) | TD (%) | MD (%) | TD (%) | | | |
| Example 1 | 2 | 2 | 8 | 8 | 529 | 0.463 | 93 |
| Comparative Example 1 | ≥30 | ≥30 | ≥70 | ≥70 | 952 | 0.452 | 93 |
| Comparative Example 2 | 2 | 2 | 9 | 9 | 543 | 0.633 | <50 |
| Comparative Example 3 | 2 | 2 | 10 | 8 | 539 | 0.326 | 86 |
| Comparative Example 4 | 2 | 2 | 8 | 9 | 541 | 0.254 | 84 |

As shown in Table 1, when the separator according to Example 1 was coated to a thickness of 40% or less, as compared to a thickness of the entire coated separator, by performing a first coating with a binder including a cross-linking reactive polyvinylpyrrolidone-based polymer and inorganic particles, and a second coating with polyvinylidene fluoride (PVdF)-based and acrylic binders, the separator showed high thermal resistance characteristics of being shrunk by 10% or less, when stored in a liquid electrolyte solution (PC, 1M $LiBF_4$) for 10 minutes, and a characteristic of moisture content of 600 ppm or less, and in addition, through the second coating layer, which is an electrode adhesion layer, the separator showed wet adhesion of 0.4 gf/mm or more. In case Comparative Example 1, in which CMC, an aqueous binder of a ceramic-coated separator in the art, was applied, when a coating layer was formed on a porous substrate to a thickness of 30% or less as compared to a total thickness of the coated separator, the separator shunk by 70% or more when stored in a liquid electrolyte solution (PC, 1M $LiBF_4$) for 10 minutes, and moisture content was also shown to be high, around 1,000 ppm.

Through the results of Example 1 and Comparative Examples 2 to 4, it may be seen that adhesion of 0.4 gf/mm or more may be displayed by adjusting a content ratio of polyvinylidene fluoride (PVdF)-based and acrylic binders in the electrode adhesion layer.

Evaluation Example 5: Evaluation of Lifespan Characteristics

Lithium batteries were prepared as follows, and lifespan characteristics were evaluated.

(Preparation of Negative Electrode)

97 wt % of graphite particles with an average particle diameter of 25 μm, 1.5 wt % of styrene-butadiene rubber (SBR) binder, and 1.5 wt % of carboxymethylcellulose (CMC), were mixed, and then put in distilled water, and stirred for 60 minutes by using a mechanical stirrer to prepare negative active material slurry. The slurry was applied on a 10 μm thick copper current collector by using a doctor blade, dried in a hot air dryer at 100° C. for 0.5 hours, dried again for 4 hours under vacuum conditions at 120° C., and then roll-pressed, to prepare a negative electrode plate.

(Preparation of Positive Electrode)

97 wt % of $LiCoO_2$, 1.5 wt % of carbon black powder as a conductive material, and 1.5 wt % of polyvinylidene fluoride (PVDF) were mixed, put into an N-methyl-2-pyrrolidone solvent, and stirred for 30 minutes by using a mechanical stirrer to prepare positive active material slurry. The slurry was applied on a 20 μm thick aluminum current collector by using a doctor blade, dried in a hot air dryer at 100° C. for 0.5 hours, dried again for 4 hours under vacuum conditions at 120° C., and then roll-pressed, to prepare a positive electrode plate.

(Electrode Assembly Jelly Roll)

An electrode assembly jelly roll was prepared by interposing each of the separators prepared in Example 1 and Comparative Examples 1 to 4 between the positive electrode plate and the negative electrode prepared above, and then winding the electrode assembly. After inserting the jelly roll into a pouch and injecting a liquid electrolyte, the pouch was vacuum-sealed.

As the liquid electrolyte, a mixed solution of ethylene carbonate (EC), ethylmethyl carbonate (EMC), and diethyl carbonate (DEC) mixed in a volume ratio of 3:5:2, into which 1.3 M of $LiPF_6$ was dissolved, was used.

The jelly roll inserted into a pouch was subjected to thermal softening at a temperature of 70° C. for 1 hour while applying a pressure of 250 $kgf/cm^2$, and was pre-charged to a state of charge (SOC) of 50%.

Subsequently, the pouch was degassed, and the jelly roll was charged at a constant current of 0.2 C rate until the voltage reached 4.3 V, and then, while maintaining a constant voltage of 4.3 V, charged until the current reached 0.05 C, at a temperature of 45° C. for 1 hour while applying a pressure of 200 $kgf/cm^2$. Subsequently, the jelly roll was discharged at a constant current of 0.2 C until the voltage reached 3.0 V, and the cycle was repeated 5 times to perform a formation process.

(Evaluation of Lifespan Characteristics)

For the lithium battery prepared above, a charge/discharge experiment was performed at room temperature of 25° C., initial formation efficiency was evaluated by 0.1 C charging/0.1 C discharging, and lifespan was evaluated by repeating 1 C charging/1 C discharging 280 times. The lifespan characteristic was calculated as a capacity retention ratio defined by Equation 1 below:

Capacity retention rate (%)=[discharge capacity in each cycle/discharge capacity in 1st cycle]×100. <Equation 1>

Results of measuring capacity retention rates of the lithium batteries of Example 1 and Comparative Examples 1 to 4 are shown in FIG. 4, and capacity retention rates at 280th cycle are shown in Table 1 above.

As shown in FIG. 4 and Table 1, the lithium battery employing the separator of Example 1 exhibits high thermal resistance and low moisture content, and shows equivalent level of lifespan characteristics to Comparative Example 1 which employed CMC, an existing aqueous binder of a ceramic-coated separator in the art.

Hitherto embodiments have been described with reference to drawings and examples, but these are only illustrative, and those skilled in the art will be able to understand that various modifications and equivalent other embodiments are possible therefrom. Therefore, the scope of the present disclosure should be defined by the appended claims.

EXPLANATION OF REFERENCE NUMERALS

11 Porous substrate; 12, 12' First coating layer;
13, 13' Second coating layer;
1 Lithium battery; 2 Negative electrode;
3 Positive electrode; 4 Separator;
5 Battery case; 6 Cap assembly;
7 Pouch

INDUSTRIAL APPLICABILITY

The separator according to an aspect has high thermal resistance characteristics and enhanced electrode plate adhesion, and therefore, a lithium battery having excellent lifespan characteristics may be provided.

The invention claimed is:

1. A separator, comprising:

a porous substrate;

a first coating layer arranged on one surface of the porous substrate, the first coating layer including a binder and inorganic particles, wherein the binder includes a cross-linked product of an aqueous cross-linking reactive poly(vinylamide)-based copolymer, wherein the poly(vinylamide)-based copolymer includes repeating units derived from vinylamide monomers, and repeating units derived from cross-linking reactive group-containing monomers, and is cross-linked by cross-linking reactive groups; and a second coating layer arranged on two opposite surfaces of the porous substrate, the second coating layer including an acrylic copolymer and a polyvinylidene fluoride-based binder in a weight ratio of greater than 1:1 and less than 1:4.

2. The separator as claimed in claim 1, wherein the cross-linking reactive groups include at least one selected from a carboxyl group, an amine group, an isocyanate group, a hydroxyl group, an epoxy group, and an oxazoline group.

3. The separator as claimed in claim 1, wherein the cross-linking reactive group-containing monomers are carboxyl group-containing monomers.

4. The separator as claimed in claim 1, wherein the cross-linking reactive group-containing monomers are carboxylic acid selected from acrylic acid, methacrylic acid, carboxyethyl acrylate, carboxypentyl acrylate, itaconic acid, maleic acid, fumaric acid, crotonic acid, and isocrotonic acid, monovalent metal salts, divalent metal salts, ammonium salts and organic amine salts thereof, and mixtures thereof.

5. The separator as claimed in claim 1, wherein the vinylamide monomers are selected from vinylpyrrolidone, vinylcaprolactam, N-vinylformamide, N-vinylacetamide, N-vinyl-N-methylacetamide, and mixtures thereof.

6. The separator as claimed in claim 1, wherein:
the vinylamide monomers include vinylpyrrolidone, and
the cross-linking reactive group-containing monomers include (meth)acrylic acid.

7. The separator as claimed in claim 1, wherein, in the poly(vinylamide)-based copolymer, a content of the repeating units derived from the cross-linking reactive group-containing monomers is greater than 0 mol % and less than 50 mol %, with respect to total moles of monomer components constituting the poly(vinylamide)-based copolymer.

8. The separator as claimed in claim 1, wherein a content of the poly(vinylamide)-based copolymer is about 10 wt % to 100 wt %, with respect to a total weight of the binder.

9. The separator as claimed in claim 1, wherein:
cross-linking of the cross-linking reactive groups occurs by using a cross-linker, and
the cross-linker is at least one selected from ethylene glycol diglycidyl ether, polyethylene glycol diglycidyl ether, glycerol polyglycidyl ether, propylene glycol diglycidyl ether, polypropylene glycol diglycidyl ether, ethylene glycol, diethylene glycol, propylene glycol, triethylene glycol, tetraethylene glycol, propanediol, dipropylene glycol, polypropylene glycol, glycerin, polyglycerin, butanediol, heptanediol, hexanediol, trimethylolpropane, pentaerythricol, and sorbitol.

10. The separator as claimed in claim 9, wherein a content of the cross-linker is in a range of about 1 part by weight to about 45 parts by weight, with respect to 100 parts by weight of the poly(vinylamide)-based copolymer.

11. The separator as claimed in claim 1, wherein the acrylic copolymer includes repeating units derived from acetate group-containing monomers, in addition to repeating units derived from (meth)acrylate monomers.

12. The separator as claimed in claim 11, wherein the repeating units derived from (meth)acrylate-based monomers are repeating units derived from at least one kind of monomer selected from methyl(meth)acrylate, ethyl(meth) acrylate, propyl(meth)acrylate and butyl(meth)acrylate.

13. The separator as claimed in claim 11, wherein the repeating units derived from the acetate group-containing monomers are repeating units derived from allyl acetate or vinyl acetate.

14. The separator as claimed in claim 1, wherein the polyvinylidene fluoride-based binder is at least one selected from polyvinylidenefluoride-hexafluoropropylene (PVDF-HFP), polyvinylidene fluoride-trichloroethylene (PVDF-TCE), and polyvinylidene fluoride-trifluoroethylene (PVDF-CTFE).

15. The separator as claimed in claim 1, wherein a weight ratio of the acrylic copolymer and the polyvinylidene fluoride-based binder is in a range of about 1:2.5 to about 1:3.5.

16. The separator as claimed in claim 1, wherein the inorganic particles include at least one of boehmite, alumina, aluminum oxyhydroxide (AlOOH), zirconia, yttria, ceria, magnesia, titania, silica, aluminum carbide, titanium carbide, tungsten carbide, boron nitride, aluminum nitride, calcium carbonate, barium sulfate, aluminum hydroxide, and magnesium hydroxide.

17. The separator as claimed in claim 1, wherein a total thickness of the first coating layer and the second coating layer is in a range of about 5% to about 40% of a total thickness of the separator.

18. The separator as claimed in claim 1, wherein:
the first coating layer is directly on a first surface of the porous substrate,
one second coating layer is directly on the first coating layer, and
one second coating layer is directly on a second surface of the porous substrate opposite the first surface of the porous substrate.

19. A lithium battery, comprising:
a positive electrode;
a negative electrode; and
a separator as claimed in claim 1, the separator being arranged between the positive electrode and the negative electrode.

* * * * *